June 4, 1963  A. E. PLEGAT  3,091,943
REFRIGERATING UNIT, MORE PARTICULARLY FOR AIR COOLING
Filed Feb. 21, 1961                                         2 Sheets-Sheet 1
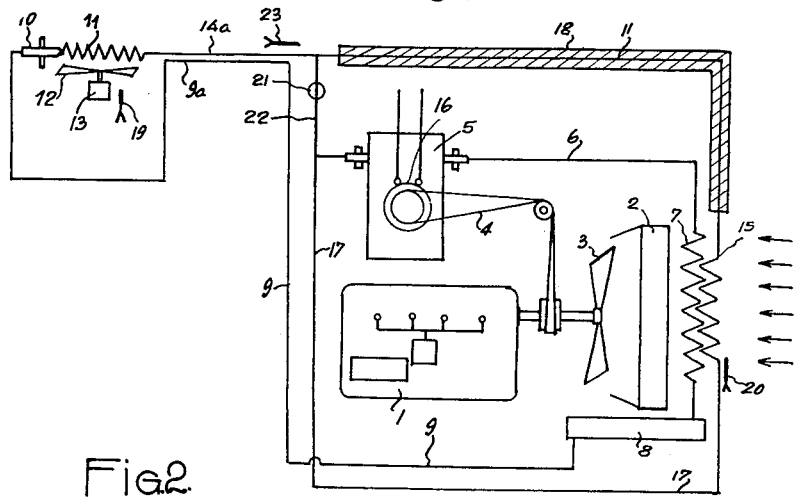
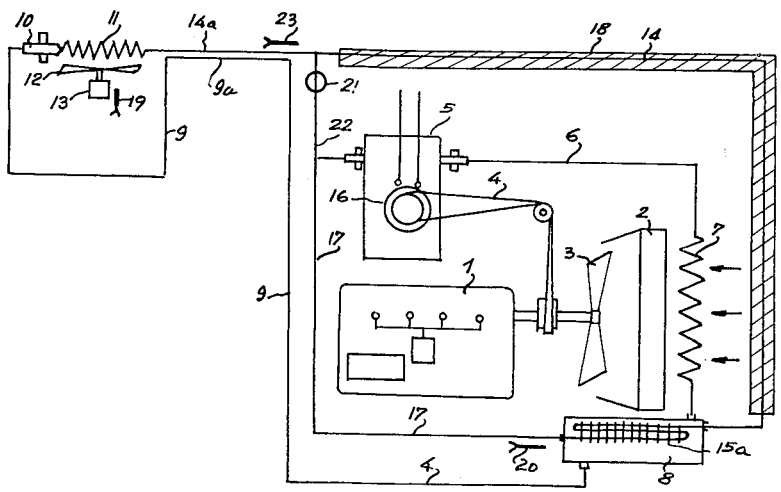
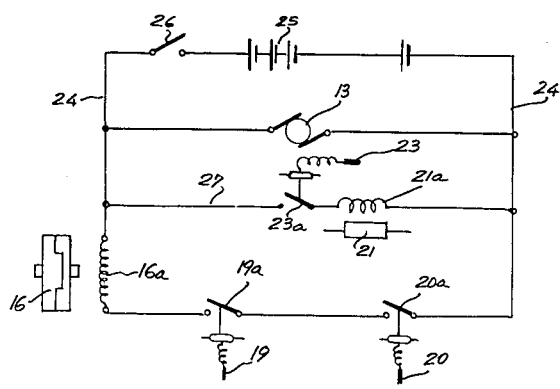
INVENTOR
ALAIN E. PLEGAT
Attys.

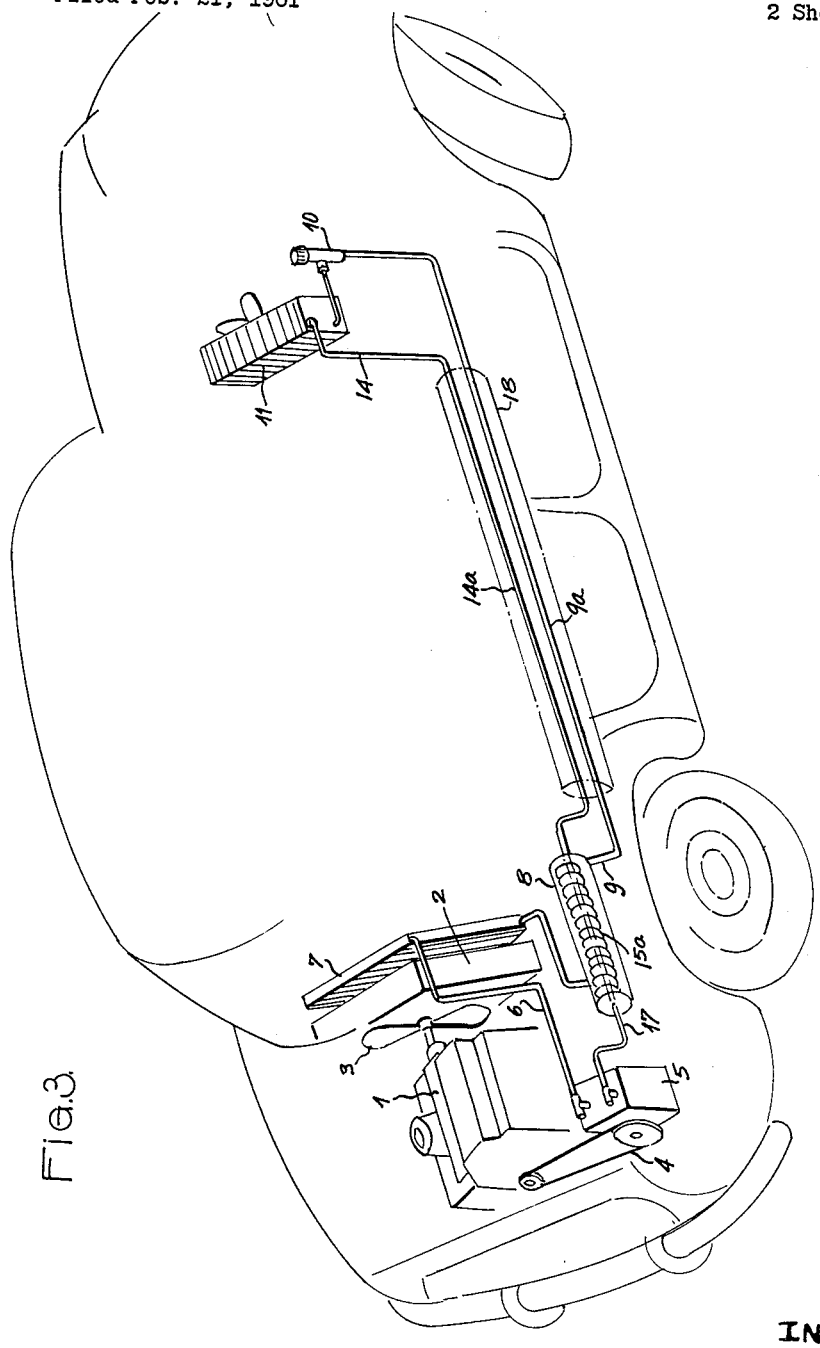

United States Patent Office 3,091,943
Patented June 4, 1963

3,091,943
REFRIGERATING UNIT, MORE PARTICULARLY FOR AIR COOLING
Alain Edouard Plegat, Asnieres, Seine, France, assignor to Societe Anonyme des Usines Chausson, Asnieres, France, a company of France
Filed Feb. 21, 1961, Ser. No. 90,876
Claims priority, application France Feb. 23, 1960
5 Claims. (Cl. 62—196)

This invention relates to installations for cooling air or any other fluid, and applies most particularly to those installations which operate according to a cycle called "compression" and in which the compressor is driven by a variable rotation speed engine.

The invention is thus intended more particularly to be employed in vehicles in which it is necessary to cool a fluid, such as air, for air-conditioning the vehicle or for cooling various gaseous or liquid fluids, more particularly if it is necessary to maintain a constant temperature for the cooling and preservation of various foodstuffs.

It is well known that existing air conditioning installations employed in vehicles have a serious disadvantage, that the variation of refrigerating power is too low during slow rotation speeds of the engine and too high during the high rotation speeds of the engine. This necessitates the producing of heat exchangers, more particularly evaporators and condensers, sufficiently large to be able to work in conditions suitable to the maximum power of the equipment. Consequently, these heat exchangers are over-dimensioned for normal power under which they must operate, and hence, are cumbersome and expensive.

The condenser being generally placed in front of the cooling radiator of the engine, there is a resultant overload for the latter and it is necessary to take this into account when making these radiators, which makes it obligatory to use special and expensive radiators.

Another drawback arises out of the fact that the free spaces on vehicles are generally small, so that exchangers must have as limited diameters as possible, but for high rotation speeds of the engine, this results in too high a pressure in the condenser of the equipment, hence a harmful overload of the refrigerating compressor.

If, moreover, there is a return of liquid to the compressor, and this risk must not be overlooked, this involves the dilution of the lubricating oil of the compressor and often the breaking of its valves and risk of the compressor seizing.

Although the invention applies, as can be seen from the foregoing, preferably to installations called "mobile," it can also be operated in fixed installations and more particularly those in which the rotation speed of the engine driving the compressor is constant, but where the refrigerating load is rapidly variable, as is the case in equipment comprising several evaporators which can be selectively insulated from the refrigerating circuit. In this case, the disadvantages mentioned above in known installations also occur, because the refrigerating load is rapidly variable.

In comparison to known installations, the principal advantages afforded by the invention are:

(1) The exchangers, evaporators and condensers are smaller and cheaper;

(2) The power consumption of the compressor is less when it is driven at a high speed of rotation;

(3) When the equipment is used on a vehicle, the cooling radiator of the latter is less overloaded, so that it becomes possible to utilize a mass-produced radiator;

(4) The equipment assembly, and more particularly the evaporator, operates more regularly and does not run the risk of becoming blocked up with ice because frosting can be eliminated.

According to the invention, the compression refrigerating equipment is characterised by at least two distinct evaporators, mounted in series one with the other, the first of these evaporators acting for cooling fluid to be utilized, and the second of these evaporators being placed in heat exchange relation with the condensation circuit, the capacity of the second evaporator being moreover selected, so that the non-evaporated coolant fluid cannot come out of it and be conveyed in the form of liquid to the compressor inlet, whatever the power developed by the latter.

Various other characteristics of the invention will moreover be revealed by the detailed description which follows.

One form of embodiment of the purpose of the invention is shown, by way of non-restrictive example, in the attached drawing:

FIGURE 1 is a diagram of the equipment according to the invention.

FIG. 2 is a diagram, similar to FIG. 1, showing an alternative embodiment.

FIG. 3 is a partially cut-away perspective of motor vehicle provided with an equipment corresponding to the diagram of FIG. 2.

FIG. 4 is an electric circuit diagram showing the connections of the various electrically operated members of the equipment.

In the refrigerating equipment or unit shown in FIG. 1, we consider that the equipment is operated on a motor vehicle, in order to cool the air that must be introduced into the cab of this vehicle.

1 designates the engine of said vehicle, which is normally cooled by a liquid circulating in a radiator 2, through which air is drawn by a fan 3 driven by the engine.

The engine 1 also drives, for example, by means of belts 4 and an electro-magnetic clutch 16, a compressor 5 for compressing a coolant fluid, for example that known under the name of Freon. This fluid in vapor state is conveyed through piping 6 into a condenser 7 which is placed immediately in front of the radiator 2, so as to be cooled by the fan 3 and the air normally traversing the radiator when the vehicle is running and drawn by fan 3.

The condensate coming from the condenser 7 is then conveyed to a tank 8 and connected by a pipe 9 to a constant pressure delivery expansion valve 10 which is mounted immediately above an evaporator 11 placed inside the cab of the vehicle or in a casing provided in the bonnet of the vehicle and also containing a fan 12 driven by an electric motor 13.

The evaporator 11 is advantageously calculated, although this is not absolutely a general case, so that it contains liquid throughout its circuit, so that the refrigerating power that it develops is at a maximum when the engine 1, and consequently, the compressor 5 are revolving at low speed, or approximately the idling speed of the engine.

The pipe 14 branched on to the outlet of the evaporator 11, thus contains liquid and this liquid is brought to a second evaporator 15 preferably placed, as shown by the drawing, just in front of the condenser 7. In certain cases, and this forms a preferential solution, the evaporator 15 and condenser 7 are made in the shape of the same member so that the heat exchange between this evaporator and condenser is at a maximum. The gases emerging from the evaporator 15 are then conveyed by piping 17 to the intake of the compressor 5.

The device described above has the advantage mentioned of always keeping liquid in the evaporator 11, so that its efficiency is a maximum. Actually, the fluid is expanded in the evaporator by means of an expansion valve which keeps the temperature of the expanded fluid constant independently of the compressor speed. The fluid expansion temperature at which the evaporator operates can thus be regulated to remain at or above 0° C., which eliminates the risk of frosting and prevents too cool air from being blown inside the cab of the vehicle.

The change of condition thus takes place, partially, in the evaporator 11 and then is completed to total evaporation in the evaporator 15, which has the effect of cooling the condenser 7. The condenser accordingly operates under better conditions and can be provided with a relatively low capacity.

Moreover, the pre-cooling of the condenser 7 reduces the heat of the air drawn by the fan 3, and consequently, the air made to pass through the radiator 2 is only slightly heated in this manner as compared with what it would be if no evaporator 15 were used. This enables the radiator 2 for a vehicle provided with air cooling equipment, to be designed in an appreciably more generous manner than for the same vehicle not comprising such equipment.

In order that the evaporator 11 works in the best possible conditions, the inlet pipe 9 for liquid to the expansion valve 10 is placed in heat exchange contact by at least one segment 9a with the evaporator outlet 14a so that the liquid brought to the evaporator is at the optimum temperature for the working conditions desired.

Moreover, the remaining part of the outlet pipe 14 is enclosed by insulating material 18 for reducing the heat exchange as much as possible between the liquid, or eventually the cold gases circulating in this part of the pipe, and the atmosphere so that the heat exchange occurs only in the evaporator 15, which affords a maximum cooling of the condenser 7, and consequently, the greatest recovery of power.

Furthermore, because the evaporator 15 is subjected to a very intense flow of air, the risks of carrying liquid to the compressor 5 are completely eliminated. Heat exchange of this evaporator increases with the increase of speed of the vehicle, and consequently, increases at the same time that the power of the compressor 5 increases, because the speed of this compressor is directly linked to the engine speed.

For permanently regulating the equipment, two thermostats 19 and 20 are used, the first 19 being in contact with the cooled air after its passage through the evaporator 11 and the second 20 in heat connection with the duct branched at the output of the evaporator 15. These two thermostats are preferably fitted in series in the same electric circuit described hereafter with reference to FIG. 4, so that the supplying of the windings of the electro-magentic clutch 16 is controlled by these two thermostats. It follows that operation of the compressor 5 depends both on the temperature of the air after passage through the evaporator 11 and of the temperature of the duct branched at the output of the evaporator 15.

For certain working conditions, for example, when starting up the equipment and when the ambient temperature is very high, it might be desirable to short-circuit the evaporator 15. To this end, as shown, it is advantageous to fit a shunt tube 22 below the part 14a of the pipe 14, provided with an electro-magnetic operated valve 21. This tube 22 leads to the intake of the compressor 5. The valve 21 can be automatically or hand controlled, and a thermostat 23 is placed on the tube 14a so that in the event of an exaggerated drop of temperature in this tube the shunt formed by the tube 22 is closed.

According to the alternative embodiment of FIG. 3, the evaporator 15 is no longer thermically connected to the condenser 7, but this evaporator 15 is made in the form of an exchanger 15a which is placed inside the condensed coolant fluid tank 8 provided for the purpose.

As shown by the drawing, the exchanger 15a is arranged so that it is at least partly immersed in the liquid contained by this tank which is advantageously placed horizontally.

The cold mixture formed by the liquid and the gases circulating inside the exchanger 15a thus has the effect of bringing about and accelerating the condensation of the fluid coming out of the condenser 7.

At the output of the exchanger 15a, the fluid is conveyed as previously by the pipe 17 to the intake of the compressor 5. In this case, the thermostat 20 which, according to FIG. 1, was placed at the output of the second evaporator 15, is, according to FIG. 2, placed on the tube 17 leading to the compressor intake. This arrangement has the advantage of making the exchanger 7 forming the condenser in a simpler manner, and consequently, reduces load losses of the air traversing it, so that the cooling of the radiator 2 is thus effected in the best conditions, without this causing any differences in the actual working of the equipment.

As explained in the foregoing, it is advantageous that the regulating of the equipment should be entirely automatic. To this end, as shown in FIG. 4, an electric circuit 24 is provided connecting the two terminals of a current source, for example, the accumulator battery 25 of the vehicle, to the terminals of the winding 16a of the electro-magnetic clutch 16.

On this circuit 24, a hand-operated switch 26 is placed for starting or stopping the equipment.

The thermostats 19 and 20 respectively control switches 19a, 20a, which are shunted in series on the circuit 24. When the equipment is working these two switches are closed and consequently, the compressor is driven, because the winding 16a of the clutch is fed.

If, for any reason, the temperature at the output of the principal evaporator 11 or in the tube 17 leading to the compressor inlet, reaches too low a value, one and/or the other of the switches 19a, 20a is opened by the thermostats 19 or 20, and consequently, the feed circuit of the clutch is cut off.

Because the motor 13 driving the fan 12, activating air in the vehicle after its passage in the evaporator 11, must operate so long as the principal switch 26 is closed, the motor 13 is shunted in the circuit 24 so that its feed is not influenced by the opening of the switches 19a or 20a.

A second shunt 27 is provided in the circuit 24 for feeding the winding 21a of the electro-magnetic valve 21 mounted on the tube 22 forming the shunt described above.

The shunt circuit 27 is controlled by a switch 23a operated by the thermostat 23 which is mounted on the tube 22. In this way, when the equipment has not been working for some time and is put into operation, the switch 23a is closed, and consequently, the electro-magnetic valve 21 opens the bypass tube 22.

In this way, the greater part of the fluid coming from the principal evaporator 11 is thus brought directly to the compressor inlet 5.

When the temperature in the evaporator 11, and consequently, in the shunt 22 reaches a sufficiently low level, the switch 23a is opened by the action of the thermostat 23, so that the electro-magnetic valve 21 closes the tube 22, which compels the fluid coming from the principal evaporator 11 entirely to pass through the tube 14 and secondary evaporator 15 or the exchanger 15a.

The thermostat 23 being placed on the tube 14a, i.e., at the output of the principal evaporator 11, it follows that the shunt circuit 27 cannot be closed except in the event of an exaggerated rise of temperature in the tube, which can only occur if all the liquid conveyed to the evaporator 11 is volatilized in the latter. Consequently, the bypass 22 is only used during a short moment when starting up the equipment and especially for operating at low speed when the evaporator 11 suffices to dissipate all the refrigerating power. This bypass also enables load losses to be limited to the gases sucked in by the compressor, as well as to limit their overheating.

The invention is not restricted to the forms of embodiment shown and described in detail, for various modifications can be applied to it without going outside of its scope.

What I claim is:

1. A compression refrigerating equipment particularly for air cooling an automotive vehicle having a combustion engine provided with a cooling radiator through which air is sucked by a fan, comprising a compressor for a coolant fluid, means for driving said compressor from said engine, a condenser connected at the output of said compressor, said condenser being located in front of said cooling radiator and being provided at its lower part with a receiver for the condensed coolant issuing from said condenser, a duct leading from said receiver to an expansion valve and to an evaporator for the coolant fluid, a blower to blow air by said evaporator to the interior of the vehicle, said evaporator being connected to a second evaporator spaced from but in heat exchange relation to said condenser to promote condensation therein thus reducing the number of calories transmitted by said condenser to said cooling radiator of the engine, and a duct leading from said second evaporator to the inlet of said compressor, said means for driving the compressor comprising an electromagnetic clutch interposed between the engine and the compressor and two thermostats respectively recording the temperature of the cooled air after passage through the evaporator and the temperature of the coolant fluid issuing from the second evaporator, said two thermostats controlling a pair of switches in series in an electric circuit for energizing said electromagnetic clutch.

2. A compression refrigerating equipment particularly for air cooling an automotive vehicle having a combustion engine provided with a cooling radiator through which air is sucked by a fan, comprising a compressor for a coolant fluid, means for driving said compressor from said engine, a condenser connected at the output of said compressor, said condenser being located in front of said cooling radiator and being provided at its lower part with a receiver for the condensed coolant issuing from said condenser, a duct leading from said receiver to an expansion valve and to an evaporator for the coolant fluid, a blower to blow air past said evaporator to the interior of the vehicle, said evaporator being connected to a second evaporator spaced from but in heat exchange relation to said condenser to promote condensation therein thus reducing the number of calories transmitted by said condenser to said cooling radiator of the engine, a duct leading from said second evaporator to the inlet of said compressor, a bypass duct connecting the output of the evaporator with the inlet of the compressor, and a valve mounted in said bypass duct for opening the duct to shunt said second evaporator.

3. A compression refrigerating equipment particularly for air cooling an automotive vehicle having a combustion engine provided with a cooling radiator through which air is sucked by a fan, comprising a compressor for a coolant fluid, means for driving said compressor from said engine, a condenser connected to the output of said compressor, said condenser being located in front of said cooling radiator and being provided at its lower part with a receiver for the condensed coolant issuing from said condenser, a duct leading from said receiver to an expansion valve and to an evaporator for the coolant fluid, a blower to blow air past said evaporator to the interior of the vehicle, said evaporator being connected by an outlet duct to a second evaporator spaced from but in heat exchange relation to said condenser to promote condensation therein thus reducing the number of calories transmitted by said condenser to said cooling radiator of the engine, a duct leading from said second evaporator to the inlet of said compressor, a bypass duct connecting the output of the first evaporator with the inlet of said compressor, and a thermostatically operated electromagnetic valve positioned in said bypass duct, said last named valve having a thermostat positioned in heat exchange relation to said outlet duct of the first evaporator whereby to open the bypass duct and shunt said second evaporator when said electromagnetic valve is operated.

4. A compression refrigerating equipment particularly for air cooling an automotive vehicle having a combustion engine provided with a cooling radiator through which air is sucked by a fan, comprising a compressor for a coolant fluid, means for driving said compressor from said engine, a condenser connected to the output of said compressor and located in front of said cooling radiator, a receiver connected to the lower part of the condenser for condensed coolant issuing therefrom, a duct leading from said receiver to an expansion valve and to an evaporator for the coolant fluid, a blower to blow air past said evaporator to the interior of the vehicle, said evaporator being connected by an outlet duct to a second evaporator spaced from but in heat exchange relation to said condenser to promote condensation therein thus reducing the number of calories transmitted by said condenser to said cooling radiator of the engine, a duct leading from said second evaporator to the inlet of said compressor, said means for driving the compressor comprising an electromagnetic clutch interposed between the engine and the compressor and a controlling electric circuit including in series, a current source, a main control switch, the electromagnetic clutch and a pair of switches provided with actuating thermostats respectively positioned to record the temperature of air after passage through said evaporator and the temperature of the coolant fluid issuing from said second evaporator, the current source and main control switch in series being connected across an electric motor for driving said blower and also across a thermostatically operated electromagnetic valve whose thermostat is positioned in heat exchange relation to said outlet duct of the first named evaporator, said electromagnetic valve being mounted on a duct connecting the output of said first evaporator and the compressor inlet to bypass said second evaporator when actuated.

5. A compression refrigerating equipment particularly for air cooling an automotive vehicle having a combustion engine provided with a cooling radiator through which air is sucked by a fan, comprising a compressor for a coolant fluid, means for driving said compressor from said engine, a condenser connected to the output of said compressor, said condenser being located in front of said cooling radiator and being provided at its lower part with a receiver for the condensed coolant issuing from said condenser, a duct leading from said receiver to an expansion valve and to an evaporator for the coolant fluid, a blower to blow cooled air past said evaporator to the interior of said vehicle, said evaporator being connected to a second evaporator located inside said receiver, and a duct leading from said second evaporator to the inlet of said compressor, the location of said second evaporator inside the receiver promoting condensation therein and preventing overheating of the cooling radiator.

References Cited in the file of this patent

UNITED STATES PATENTS

| 2,521,040 | Casetta | Sept. 5, 1950 |
| 2,624,179 | Daisy | Jan. 6, 1953 |
| 2,720,087 | Groene | Oct. 11, 1955 |
| 2,752,760 | Kaufman | July 3, 1956 |
| 2,884,768 | Gould | May 5, 1959 |